US010907401B2

(12) United States Patent
Gubbels et al.

(10) Patent No.: US 10,907,401 B2
(45) Date of Patent: Feb. 2, 2021

(54) TRANSPARENT UNIT

(71) Applicant: DOW SILICONES CORPORATION, Midland, MI (US)

(72) Inventors: Frederic Gubbels, Seneffe (BE); Victor Baily, Seneffe (BE); Tatiana Dimitrova, Seneffe (BE); Davide Bianchi, Milan (IT)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/490,298

(22) PCT Filed: Feb. 7, 2018

(86) PCT No.: PCT/US2018/017190
§ 371 (c)(1),
(2) Date: Aug. 30, 2019

(87) PCT Pub. No.: WO2018/160325
PCT Pub. Date: Sep. 7, 2018

(65) Prior Publication Data
US 2020/0071988 A1   Mar. 5, 2020

(30) Foreign Application Priority Data

Mar. 3, 2017 (GB) .................................. 1703487.7
Sep. 15, 2017 (GB) .................................. 1714888.3
Oct. 2, 2017 (GB) .................................. 1716074.8

(51) Int. Cl.
*E06B 3/673* (2006.01)
*C03C 27/10* (2006.01)
(Continued)

(52) U.S. Cl.
CPC .......... *E06B 3/67326* (2013.01); *C03C 27/10* (2013.01); *C09J 5/06* (2013.01);
(Continued)

(58) Field of Classification Search
CPC ............. E06B 3/67326; E06B 3/66333; E06B 2003/66338; C09J 183/06; C09J 11/04;
(Continued)

(56) References Cited

U.S. PATENT DOCUMENTS 2,011,557 A * 8/1935 Anderegg ............. E06B 3/6612
428/34
2014/0246155 A1   9/2014 Nicolosi
(Continued)

FOREIGN PATENT DOCUMENTS

GB        2424898 A    10/2006
JP        H0741338 A    2/1995
(Continued)

OTHER PUBLICATIONS

International Search Report for PCT/US2018/017190 dated May 18, 2018, 3 pages.
(Continued)

*Primary Examiner* — Donald J Loney
(74) *Attorney, Agent, or Firm* — Warner Norcross + Judd LLP

(57) ABSTRACT

Improvements in or relating to transparent units (such as glazing units, which may also be referred to as insulating glass units) and their methods of manufacture are disclosed. Each transparent unit comprises first and second panes of transparent material each having an outwardly facing side and an inwardly facing side. Each inwardly facing side is at least partially coated with a reactive interlayer made by the application of a reactive interlayer coating composition. The inwardly facing side of the first and second panes of transparent material are spaced apart partially or totally by a transparent spacer made of a pre-cured condensation curable material or a substantially pre-cured condensation curable material adhered to the inwardly facing side of the first and (Continued)

second panes of transparent material by way of the reactive interlayers. In various embodiments, the pre-cured condensation curable material is a silicone based material.

20 Claims, 2 Drawing Sheets

(51) Int. Cl.
    *C09J 5/06*     (2006.01)
    *C09J 11/04*     (2006.01)
    *C09J 183/06*     (2006.01)
    *E06B 3/663*     (2006.01)

(52) U.S. Cl.
    CPC .............. *C09J 11/04* (2013.01); *C09J 183/06* (2013.01); *E06B 3/66333* (2013.01); *C09J 2483/00* (2013.01); *Y02B 80/22* (2013.01)

(58) Field of Classification Search
    CPC ......... C09J 5/06; C09J 2483/00; C03C 27/10; Y02B 80/22
    See application file for complete search history.

(56) References Cited

U.S. PATENT DOCUMENTS

| | | | |
|---|---|---|---|
| 2016/0120336 A1* | 5/2016 | Schneider | E06B 3/5409 312/116 |
| 2017/0362882 A1 | 12/2017 | Boucher et al. | |

FOREIGN PATENT DOCUMENTS

| | | |
|---|---|---|
| JP | H11100240 A | 4/1999 |
| JP | 2006273705 A | 10/2006 |
| JP | 2010042965 A | 2/2010 |
| JP | 2014531544 A | 11/2014 |
| JP | 6350508 B2 | 7/2018 |
| WO | 2005100278 A1 | 3/2008 |
| WO | 2012119940 A1 | 9/2012 |
| WO | 201691954 A1 | 6/2016 |
| WO | 2016120270 A1 | 8/2016 |
| WO | 2017191322 A1 | 11/2017 |

OTHER PUBLICATIONS

Machine assisted English translation of JPH0741338A obtained from https://patents.google.com/patent on Mar. 23, 2020, 4 pages.
Machine assisted English translation of JPH11100240A obtained from https://patents.google.com/patent on Mar. 23, 2020, 16 pages.
Machine assisted English translation of WO2005100278A1 obtained from https://patents.google.com/patent on Mar. 23, 2020, 17 pages.
Machine assisted English translation of JP2006273705A obtained from https://patents.google.com/patent on Mar. 23, 2020, 27 pages.
Machine assisted English translation of JP2010042965A obtained from https://patents.google.com/patent on Mar. 23, 2020, 9 pages.
Machine assisted English translation of JP6350508B2 obtained from https://patentsgoogle.com/patent on Mar. 23, 2020, 10 pages.

\* cited by examiner

TRANSPARENT UNIT

CROSS-REFERENCE TO RELATED APPLICATIONS

This application is the National Stage of International Application No. PCT/US2018/017190 filed on 7 Feb. 2018, which claims priority to and all advantages of Great Britain (GB) Patent Application No. 1703487.7 filed on 3 Mar. 2017, GB Patent Application No. 1714888.3 filed on 15 Sep. 2017, and GB Patent Application No. 1716074.8 filed on 2 Oct. 2017, the contents of which are hereby incorporated by reference.

This invention is concerned with improvements in or relating to transparent units such as glazing units which may also be referred to as insulating glass units and their methods of manufacture.

It has been standard practice for many years to form transparent units such as insulating glass units (IGUs) consisting of two, three, or more glass panes spaced apart by a spacing and sealing assembly (generally referred to as "edge seal") extending around the periphery of the inner facing surfaces of the glass panes to define a substantially hermetically sealed insulating space between the glass panes. It is a common practice to employ one or more spacers to separate the glass panes and to assure the required rigidity of the unit. Whilst a spacer may self-adhere to glass it is commonly adhered to the glass using a so-called "primary" sealant e.g. a "butyl sealant" which is a polyisobutylene rubber based composition as primary sealant to bond metal spacers to the glass panes and to employ a secondary sealant bonded to the panes around the spacer. A gas other than air, for example, an inert gas such as argon, xenon, krypton or $SF_6$ may be introduced into the insulating glazing unit with a view to improving the level of thermal or acoustic performance required. In a transparent unit e.g. a glazing unit as described, the primary sealant ensures satisfactory adhesion of the spacer to the glass panes so as to provide desired moisture vapour and/or gas impermeability to the unit, thus seeking to prevent moisture or water vapour entering and condensing in the cavity of the unit and, in case of a gas filled unit avoiding escape of gas from the unit. The secondary sealant serves to promote the integrity of the bond of the self-adhered spacer or primary sealant by minimising the strain imposed on it due to external factors such as fluctuations in ambient temperature, barometric pressure, or wind pressure.

A wide variety of spacers have been proposed, for example, the insulating glass unit can comprise glass sheets (panes) which are spaced apart and adhered to one another by a self-adhering thermoplastic spacer. During assembly of such a unit, the spacer is applied as a strand, for example by extrusion, onto a first of the two glass panes along its edge. The beginning and the end of the strand may be joined. The glass panes are then assembled and pressed together to a predetermined distance apart, equal to the width that the spacer is to have in the insulating glass unit, so that the strand of thermoplastic material is pressed against the glass panes and bonds the panes together.

Other spacers used include foamed plastics materials, for example a silicone foam or a polyolefin foam such as an ethylene propylene diene terpolymer foam, a mastic, for example a polyisobutylene mastic, containing a reinforcement which helps to keep the glass sheets the required distance apart when the insulating glass unit is assembled. A further alternative spacer may be a hollow section for example an aluminium or stainless steel section or a hollow section of rigid plastics material, generally containing a desiccant. Typically such spacers are used in conjunction with a primary sealant to adhere the spacer to the glass and a secondary sealant layer, for example a layer of silicone elastomer, polyurethane, polysulfide, butyl hot melt or polyurethane reactive hot melt located at the periphery of the insulating glass unit between the edge portions of the glass panes, such that the layer of secondary sealant is in contact with external surface of the spacer. For example, in one typical form of insulating glass unit construction, the edge seal comprises a hollow metal spacer element adhered to the inner facing surfaces of the glass panes by a low gas and moisture permeable sealant to provide a primary hermetic seal. The hollow spacer element is filled with a desiccant material, which is put in communication with the insulating space between the glass panes to absorb moisture therefrom in order to improve the performance and durability of the insulating glass unit.

As mentioned above, various materials have been used to provide the secondary sealant, including for example polysulphides, polyurethanes and silicones. However, the vast majority of commercially available materials currently used as primary and/or secondary sealants are black or white or another colour i.e. non-transparent, thereby reducing the area of the insulating glass unit through which light may pass.

Today another important issue for the insulating glass unit manufacturer is the prevention of heat loss from a building or the like. Thermal transfer by conduction or convection can be decreased by substituting or partially substituting air present in the cavity of the insulating glass unit with a heavy rare gas having a lower thermal conductivity for example an inert gas such as argon, xenon, krypton or $SF_6$. Transfer by radiation can be decreased using low-emissivity (low E) glass. Typically, the thermal coefficient (the so-called "K-value", which is a measure of the flux of heat energy through an area of 1 $m^2$ in the centre of the insulating glass unit for a temperature difference of 1° K. between the interior and exterior) for high performance insulating glass units filled with gas is below 1.5 and can be as low as 1.2, some combinations of low E coatings and special gases allowing K-values below 1.0 $W/m^2/K$. (i.e. Watts per square meter per degree Kelvin). For acoustic performance, beside the use of glass pane elements with different thickness in combination with laminated glass, a better acoustic performance can also be achieved by replacing a part or all of the air or rare gas present in the cavity by $SF_6$ gas.

Although desirably low K-values can be obtained with special gas filling and low E-coatings in the centre of the insulating glass unit, the use of conventional edge seal systems, containing a metal spacer, results in higher thermal conductivity at the perimeter of the insulating glass unit. This higher conductivity at the edge seal causes water condensation to occur on the interior glass surface under certain environmental conditions and is therefore undesirable. Several technical solutions have been proposed regarding edge seals with reduced thermal conductivity (so-called "warm edge" systems).

Whilst edge sealing systems, such as warm edge systems, reduce thermal conductivity compared to units relying on metal spacers, they also rely on materials which are generally coloured, e.g. black and non-transparent and as such reduce the viewing area of a person looking through the window. It is the aim herein to maximise the viewing area by providing a transparent edge seal.

It is an object herein to provide an insulating glass unit with a transparent spacer to enlarge the viewing region of the insulated glass unit.

The present invention provides in one of its aspects an insulating glass unit comprising two glass panes spaced apart by a transparent silicone spacer material adherent to the panes, optionally having an inert or heavy gas trapped within the unit. The spacer may have a suitable primary and secondary sealant around the periphery of the unit between edge portions of the glass panes and in contact with external surfaces of the spacer.

Hence there is provided a transparent unit comprising first and second panes of transparent material each having an outwardly facing side and an inwardly facing side, each inwardly facing side is at least partially coated with a reactive interlayer and the inwardly facing side of said first and second panes of transparent material are spaced apart partially or totally by a transparent spacer made of a pre-cured condensation curable material or a substantially pre-cured condensation curable material adhered to the inwardly facing side of said first and second panes of transparent material by way of said reactive interlayers. The transparent a glazing unit typically an insulated glazing unit, and the first and second panes of transparent material are glass.

Figure 1:
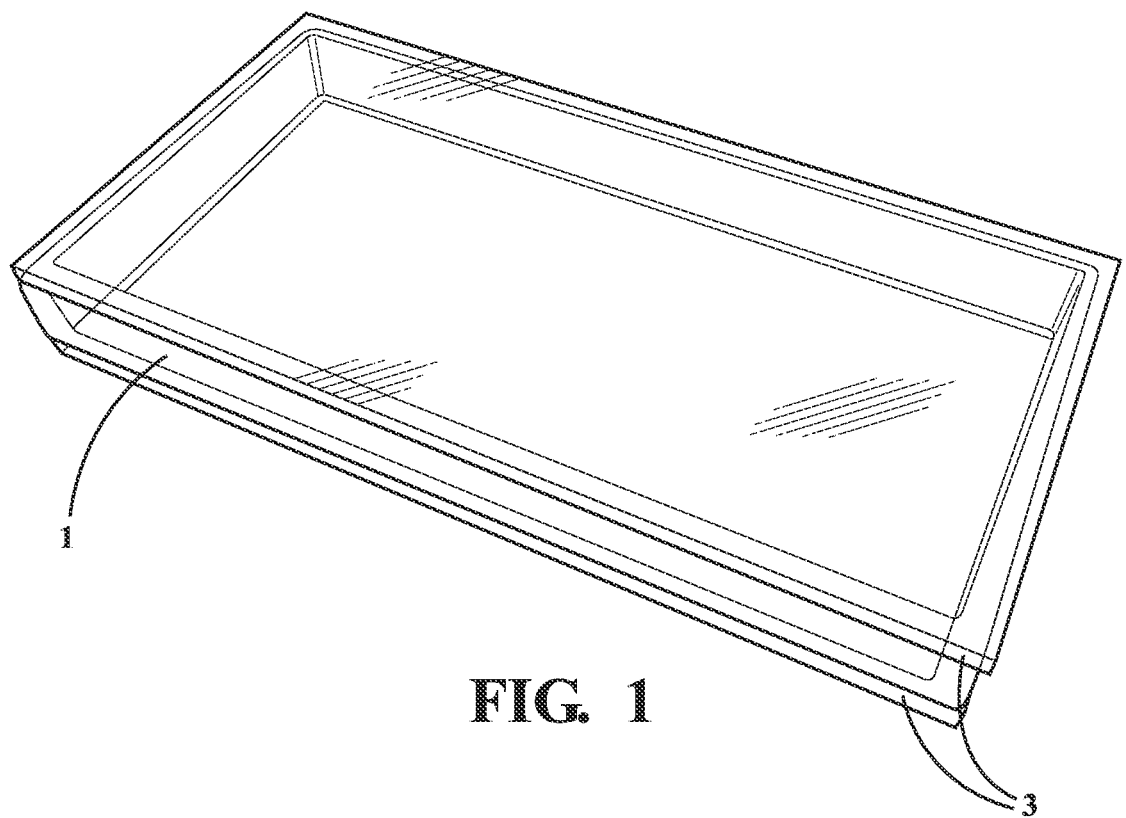
FIGS. 1 and 2 depict two examples of panes of glass separated by transparent spacers.

The pre-cured condensation curable spacer material is a substantially pre-cured or fully pre-cured silicone based material obtained by curing a condensation curable composition comprising:
(i) at least one condensation curable silyl terminated polymer having at least one, typically at least 2 hydrolysable and/or hydroxyl functional groups per molecule;
(ii) a cross-linker selected from the group of
silanes having at least 2 hydrolysable groups, alternatively at least 3 hydrolysable groups per molecule group; and/or
silyl functional molecules having at least 2 silyl groups, each silyl group containing at least one hydrolysable group.
(iii) a condensation catalyst selected from the group of titanates and zirconate; characterized in that:
the molar ratio of hydroxyl groups to hydrolysable groups is between 0.1:1 to 4:1
and the molar ratio of M-OR functions to the hydroxyl groups is from 0.01:1 and 0.6:1, where M is titanium or zirconium.

It is important to understand that the aforementioned pre-cured condensation curable material is not a pressure-sensitive adhesive (PSA). A PSA forms a bond with a substrate by the application of light pressure to marry the adhesive with the substrate surface, which is often referred in the industry by the term 'tack' or 'tackiness' of the product. The resulting physical bonds form because the adhesive is soft enough to flow, or wet, the substrate surface but also has strength because the adhesive is hard enough to resist flow when stress is applied to the bond. Once the adhesive and the substrate surface are in proximity, molecular interactions such as van der Waals forces may contribute significantly to the ultimate bond strength. That said what is typically referred to as chemical adhesion by the chemical bonding of reactive groups across the adhesive/substrate interface and a pre-cured PSA largely do not occur.

For the avoidance of doubt and for the sake of this disclosure the term "physical adhesion" is intended to mean non-chemical adhesion, i.e. a temporary or reversible form of adhesion by physical interaction between adjacent surfaces e.g. (but not limited to) dispersive and/or diffusive adhesion.

A silicone pressure sensitive adhesive is generally understood to be an adhesive comprising one or more siloxane components possessing sufficient tackiness and cohesive strength so that it can be adhered with mild pressure to a clean substrate and then usually can be ripped therefrom if necessary. Such PSAs are generally if not always uncured when applied to a substrate surface and cure in place. Softer PSAs of this type, especially those exhibiting a hardness below Shore 80 in the type 00 scale according to ASTM D 2240-05(2010), have been found to successfully physically adhere to a wide variety of substrates. These compositions are reliant on titanate/zirconate cure catalysts that can be cured in the absence of moisture bearing filler leading to a bulk cure in a few minutes to a few hours depending on the composition.

It is well known that a primer can be used to improve adhesion of an uncured (wet applied) sealant composition to surface when cured. However primers are not used to adhere pre-cured elastomers to substrates. Primer materials enhance the adhesion of condensation curable silicone based compositions to substrate surfaces e.g. metal surfaces. Primers are relatively thin coatings designed to adhere to the surface of a substrate to form a binding layer that is better prepared to receive e.g. silicone sealant or a layer of paint or the like. Typically the primer will be thinly applied and will dry/cure in a few seconds or minutes. If the user wishes to adhere a sealant material to the substrate surface via the use of a primer subsequent to drying the primer, a layer of uncured sealant is applied to the primed substrate surface and after working (if necessary) the sealant is allowed to cure. The fact that the sealant is applied uncured has, historically, been critical in order to generate a chemical interaction between the curing sealant composition at its interface with the primer on the substrate surface. If the sealant is applied onto the primed surface post-cure little or no chemical interaction will take place at the interface because the layer of sealant has pre-cured and therefore has little or no chemically active groups available for chemically binding with active groups at the surface of the binder. In the present invention the term reactive interlayer coating composition is used to define suitable liquid coating compositions, not only primers, which may be applied to a surface of a substrate and then dried/cured to provide a surface coating of a submicronic thickness, but also liquid compositions, which cure to provide thicker coatings on the surface of a substrate, which may be millimetric.

A typical spacer is designed to keep two panes of glass apart and in this instance there is a strong adhesive bond between each pane of glass and the spacer. In many warm edge type sealing solutions a primary sealant is required to adhere the spacer to a glass substrate. In the present case, such sealants are not required when the region of the glass pane to which a spacer is to be adhered is first coated with a reactive interlayer coating composition. The reactive interlayer is prepared by the application of a reactive interlayer coating composition onto a substrate surface, which reactive interlayer coating composition is a coating composition or a layer of an uncured sealant composition which can chemically interact with both the substrate surface and/or the silicone based material surface e.g. the spacer material.

The reactive interlayer coating composition is allowed to dry/cure on the surface of the glass to form a reactive interlayer coating and then the pre-cured silicone spacer is applied onto the resulting dried reactive interlayer coating. A second pane of glass which has been pre-treated with reactive interlayer coating composition may then be placed on the top of the spacer material and the surface thereof is adhered to the spacer. Again in the present case the spacer material as hereinbefore described has significant strength and adheres well to the glass substrate if pre-coated with the reactive interlayer, as a result, such spacer can be used without sealing material.

Any suitable coating composition may be used as the reactive interlayer coating composition but preferably the coating composition will consist or comprise an appropriate composition containing a titanate or zirconate ingredient and/or a tin (II) and tin (IV) based ingredient. The reactive interlayer coating composition may additionally contain silanes having groups which will chemically interact with the excess of silanol groups in the silicone based material and/or adjacent transparent substrate, i.e. containing various functional groups such as amines, thiol, epoxy, alkoxy, acetoxy, oximino to enhance adhesion on various substrates.

The substantially pre-cured condensation curable material or fully pre-cured condensation curable silicone based material is a substantially cured or fully cured elastomer or a substantially cured or fully cured gel. Typically given the above ratios the resulting cured silicone based material may be sufficiently tacky to the touch given the presence of excess hydrolysable groups for physical adhesion to occur when the substantially cured or fully cured silicone based material is brought into contact with the substrate surface. However the physical adhesion is not strong and therefore the substantially cured or fully cured silicone based material can easily be removed from unprimed surfaces e.g. peeled from the substrate surface leaving the surface of the substrate clean (i.e. free from silicone based material) (adhesive failure). It has been identified that by coating a reactive interlayer on to the substrate surface and then bringing a surface of the substantially cured or fully cured silicone based material into contact with the treated substrate surface chemical adhesion will occur resulting in a "strong" chemical bond between the two via the reactive interlayer, so that the bonded silicone elastomer/rubber is far more difficult to remove from the substrate surface. If/when the silicone elastomer/rubber is removed, typically, a layer of the silicone will remain on the surface of the substrate (cohesive failure).

The reactive interlayer coating composition when applied onto a substrate surface is applied in a relatively thin coating where appropriate and is designed to adhere to the surface of a substrate to form a binding layer that is better prepared to receive the silicone based material than the substrate surface itself. Because of the relative amounts of the components the cured silicone based material contains chemical groups i.e. OH groups or hydrolysable groups which will chemically react with the reactive interlayer when they are brought into contact with each other. Hence the reactive interlayer needs to be chemically reactive with both the substrate surface and the surface of the silicone based material and as such must be chemically able to undergo condensation reactions with both the substrate surface and the surface of the silicone based material.

The substantially pre-cured condensation curable or fully pre-cured condensation curable material silicone based material (i.e. elastomer or gel) is obtained by curing a condensation curable composition comprising:

(i) at least one condensation curable silyl terminated polymer having at least one, typically at least 2 hydrolysable and/or hydroxyl functional groups per molecule;

(ii) a cross-linker selected from the group of
   silanes having at least 2 hydrolysable groups, alternatively at least 3 hydrolysable groups per molecule group; and/or
   silyl functional molecules having at least 2 silyl groups, each silyl group containing at least one hydrolysable group and (iii) a condensation catalyst selected from the group of titanates, zirconates characterized in that:
   the molar ratio of hydroxyl groups to hydrolysable groups is between 0.1:1 to 4:1
   and the molar ratio of M-OR functions to the hydroxyl groups is from 0.01:1 and 0.6:1, where M is titanium or zirconium.

Polymer (i) is at least one or more than one moisture/condensation curable silyl terminated polymer. Any suitable moisture/condensation curable silyl terminated polymer may be utilised including polydialkyl siloxanes, alkylphenyl siloxane, or organic based polymers with silyl terminal groups e.g. silyl polyethers, silyl acrylates and silyl terminated polyisobutylenes or copolymers of any of the above. Preferably the polymer is a polysiloxane based polymer containing at least two hydroxyl or hydrolysable groups, most preferably the polymer comprises terminal hydroxyl groups. Examples of suitable hydroxyl or hydrolysable groups include —Si(OH)$_3$, —(R$^a$)Si(OH)$_2$, —(R$^a$)$_2$Si(OH), —R$^a$Si(OR$^b$)$_2$, —Si(OR$^b$)$_3$, —R$^a{}_2$SiOR$^b$ or —(R$^a$)$_2$Si—R$^c$—SiR$^d{}_p$(OR$^b$)$_{3-p}$ where each R$^a$ independently represents a monovalent hydrocarbyl group, for example, an alkyl group, in particular having from 1 to 8 carbon atoms, (and is preferably methyl); each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and p has the value 0, 1 or 2. Preferably the at least two hydroxyl or hydrolysable groups are all OH groups.

Preferably polymer (i) has the general formula:

$$X^3\text{-}A\text{-}X^1 \tag{1}$$

where $X^3$ and $X^1$ are independently selected from siloxane groups which terminate in hydroxyl or hydrolysable groups, alternatively hydroxyl groups and A is a siloxane containing polymeric chain.

Examples of hydroxyl-terminating or hydrolysable groups $X^3$ or $X^1$ include —Si(OH)$_3$, —(R$^a$)Si(OH)$_2$, —(R$^a$)$_2$Si(OH), —(R$^a$)Si(OR$^b$)$_2$, —Si(OR$^b$)$_3$, —(R$^a$)$_2$Si-OR$^b$ or —(R$^a$)$_2$Si—R$^c$—Si(R$^d$)$_p$(OR$^b$)$_{3-p}$ as defined above with each R$^b$ group, when present, typically being a methyl group. Preferably the $X^3$ and/or $X^1$ terminal groups are hydroxydialkyl silyl groups, e.g. hydroxydimethyl silyl groups or alkoxydialkyl silyl groups e.g. methoxydimethyl silyl or ethoxydimethyl silyl. Most preferably the at least two hydroxyl or hydrolysable groups are all OH groups.

Examples of suitable siloxane groups in polymeric chain A of formula (I) are those which comprise a polydiorganosiloxane chain. Thus polymeric chain A preferably includes siloxane units of formula (2)

$$-(R^5{}_s SiO_{(4-s)/2})- \tag{2}$$

in which each $R^5$ is independently an organic group such as a hydrocarbyl group having from 1 to 10 carbon atoms optionally substituted with one or more halogen group such as chlorine or fluorine and s is 0, 1 or 2, typically they are linear chains where s=2. Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups $R^5$ are methyl.

Typically the polymers of the above type will have a viscosity in the order of 1000 to 300 000 mPa·s, alternatively 1000 to 100 000 mPa·s at 25° C. measured by using a Brookfield cone plate viscometer (RV DIII) using a suitable cone plate.

Preferred polysiloxanes containing units of formula (2) are thus polydiorganosiloxanes having terminal, silicon-bound hydroxyl groups or terminal, silicon-bound organic radicals which can be hydrolysed using moisture as defined above. The polydiorganosiloxanes may be homopolymers or copolymers. Mixtures of different polydiorganosiloxanes having terminal condensable groups are also suitable.

Polymeric chain A may alternatively be an organic based polymer with silyl terminal groups e.g. silyl polyethers, silyl acrylates and silyl terminated polyisobutylenes. In the case of silyl polyethers the polymer chain is based on polyoxyalkylene based units. Such polyoxyalkylene units preferably comprise a linear predominantly oxyalkylene polymer comprised of recurring oxyalkylene units, ($-C_nH_{2n}-O-$) illustrated by the average formula ($-C_n-H_{2n}-O-$)$_y$, wherein n is an integer from 2 to 4 inclusive and y is an integer of at least four. The number average molecular weight of each polyoxyalkylene polymer block may range from about 300 to about 10,000, but can be higher in number average molecular weight. Moreover, the oxyalkylene units are not necessarily identical throughout the polyoxyalkylene monomer, but can differ from unit to unit. A polyoxyalkylene block, for example, can be comprised of oxyethylene units, ($-C_2H_4-O-$); oxypropylene units ($-C_3H_6-O-$); or oxybutylene units, ($-C_4H_8-O-$); or mixtures thereof.

Other polyoxyalkylene units may include for example: units of the structure -[$-R^e-O-(-R^f-O-)_p$-Pn-$CR^g_2$-Pn-O-($-R^f-O-)_q-R^e$]- in which Pn is a 1,4-phenylene group, each $R^e$ is the same or different and is a divalent hydrocarbon group having 2 to 8 carbon atoms, each $R^f$ is the same or different and, is, an ethylene group or propylene group, each $R^g$ is the same or different and is, a hydrogen atom or methyl group and each of the subscripts p and q is a positive integer in the range from 3 to 30.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

The backbone of the organic polymer (A) which may contain organic leaving groups is not particularly limited and may be any of organic polymers having various backbones. The backbone preferably includes at least one selected from a hydrogen atom, a carbon atom, a nitrogen atom, an oxygen atom, and a sulphur atom because the resulting composition has excellent curability and adhesion.

Crosslinkers (ii) that can be used are generally moisture curing silanes having at least 2 hydrolysable groups, alternatively at least 3 hydrolysable groups per molecule group; and/or silyl functional molecules having at least 2 silyl groups, each silyl group containing at least one hydrolysable group.

Typically, a cross-linker requires a minimum of 2 hydrolysable groups per molecule and preferably 3 or more. In some instances, the crosslinker (ii) having two hydrolysable groups may be considered a chain extender. The crosslinker (ii) may thus have two but alternatively has three or four silicon-bonded condensable (preferably hydroxyl and/or hydrolysable) groups per molecule which are reactive with the condensable groups in organopolysiloxane polymer (i). Typically the cross-linker (ii) will only have 2 hydrolysable groups when polymer (i) has at least 3 hydroxyl-terminating or hydrolysable groups to ensure cross-linking rather than chain extension. For the sake of the disclosure herein silyl functional molecule is a silyl functional molecule containing two or more silyl groups, each silyl group containing at least one hydrolysable group. Hence, a disilyl functional molecule comprises two silicon atoms each having at least one hydrolysable group, where the silicon atoms are separated by an organic or siloxane spacer. Typically, the silyl groups on the disilyl functional molecule may be terminal groups. The spacer may be an organic or siloxane based polymeric chain.

Any suitable cross-linker (ii) may be used for example alkoxy functional silanes, oximosilanes, acetoxy silanes, acetonoxime silanes, enoxy silanes. For softer materials more than one silyl group per molecule is preferable. The crosslinker (ii) used in the moisture curable composition as hereinbefore described is preferably a silane compound containing hydrolysable groups. These include one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, and propoxy) and alkenyloxy groups (for example isopropenyloxy and 1-ethyl-2-methylvinyloxy).

Alternatively, the crosslinker (ii) may have a siloxane or organic polymeric backbone. In the case of such siloxane or organic based cross-linkers the molecular structure can be straight chained, branched, cyclic or macromolecular. Suitable polymeric crosslinkers (ii) may have a similar polymeric backbone chemical structure to polymeric chain A as depicted in formula 1 above here above but typically any such crosslinkers ii utilised will be of significantly shorter chain length than polymer i.

The crosslinker (ii) may have two but preferably has at least three or four silicon-bonded condensable (preferably hydroxyl and/or hydrolysable) groups per molecule which are reactive with the condensable groups in organopolysiloxane polymer (a). In one embodiment the cross-linker (ii) used is a disilane having up to 6 hydroxyl and/or hydrolysable groups per molecule. When the crosslinker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl);

cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic group is methyl.

Silanes and siloxanes which can be used as crosslinkers (ii) include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilanre, 3,3,3-trifluoropropyltrimethoxysilane, methyltriacetoxysilane, vinyltriacetoxysilane, ethyl triacetoxysilane, di-butoxy diacetoxysilane, phenyltripropionoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above. The cross-linker may be polymeric, with a silicone or organic polymer chain bearing alkoxy functional end groups such as 1,6-bis(trimethoxysilyl)hexane (alternatively known as hexamethoxydisilylhexane).

The composition further comprises a condensation catalyst (iii). This increases the speed at which the composition cures. The catalyst (iii) chosen for inclusion in a particular silicone sealant composition depends upon the speed of cure required. Titanate and/or zirconate based catalysts (iii) may comprise a compound according to the general formula Ti[OR$^{22}$]$_4$ where each R$^{22}$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of R$^{22}$ include but are not restricted to methyl, ethyl, propyl, isopropyl, butyl, tertiary butyl and a branched secondary alkyl group such as 2,4-dimethyl-3-pentyl. Preferably, when each R$^{22}$ is the same, R$^{22}$ is an isopropyl, branched secondary alkyl group or a tertiary alkyl group, in particular, tertiary butyl. Suitable examples include for the sake of example, tetra n-butyl titanate, tetra t-butyl titanate, tetra t-butoxy titanate, tetraisopropoxy titanate and diisopropoxydiethylacetoacetate titanate. Alternatively, the titanate may be chelated. The chelation may be with any suitable chelating agent such as an alkyl acetylacetonate such as methyl or ethylacetylacetonate. Alternatively, the titanate may be monoalkoxy titanates bearing three chelating agents such as for example 2-propanolato, tris isooctadecanoato titanate. The molar ratio of M-OR functions to the hydroxyl groups is from 0.01:1 and 0.6:1, where M is titanium or zirconium. Alternatively and the molar ratio of M-OR functions to the hydroxyl groups is from 0.01:1 and 0.5:1, where M is titanium or zirconium.

The silicone based material as hereinbefore described is typically made from the condensation curable composition which is stored in a 2 part manner. The two part compositions may be mixed using any appropriate standard two-part mixing equipment with a dynamic or static mixer and is optionally dispensed therefrom for use in the application for which it is intended. In one embodiment the condensation curable composition is stored in two parts having polymer (i) and cross-linker (ii) in one part and polymer (i) and catalyst (iii) in the other part. In an alternative embodiment the condensation curable composition is stored in two parts having cross-linker (ii) in one part and polymer (i) and catalyst (iii) in the other part. In a still further embodiment the condensation curable composition is stored in two parts having a polymer (i) and optionally cross-linker (ii) in one part and a cross-linker (ii) and catalyst (iii) in the other part.

Fillers

Preferably the condensation curable composition used does not contain a filler of any sort. In particular the composition preferably does not contain fillers that brings a significant amount of moisture in the composition. Suitable anhydrous filler may be utilised if required.

Siloxane Resins

Siloxane resins comprising R$^2_3$SiO$_{1/2}$ units and SiO$_{4/2}$ units, where R$^2$ is a hydroxyl or a substituted or unsubstituted monovalent hydrocarbon radical bound directly or via an oxygen atom to the silicon atom. The monovalent hydrocarbon radical typically contains up to 20 carbon atoms R$^2_3$SiO$_{1/2}$ typically from 1 to 10 carbon atoms. Examples of suitable hydrocarbon radicals for R$^2$ include alkyl radicals such as methyl, ethyl, propyl, pentyl, octyl, undecyl and octadecyl radicals; alkenyl radicals such as vinyl, allyl, and 5-hexenyl; cycloaliphatic radicals such as cyclohexyl and cyclohexenylethyl and aryl radicals such as phenyl, tolyl, xylyl, benzyl and 2-phenylethyl. Typically at least one third, alternatively at least two thirds of the R$^2$ radicals are methyl radicals. Examples of R$^2_3$SiO$_{1/2}$ units include but are not limited to Me$_3$SiO$_{1/2}$, PhMe$_2$SiO$_{1/2}$ and Me$_2$ViSiO$_{1/2}$ where Me, Ph and Vi denote methyl, phenyl and vinyl respectively. The siloxane resin may contain two or more of these groups. The molar ratio of the R$^2_3$SiO$_{1/2}$ units and SiO$_{4/2}$ units in the siloxane resin is typically from 0.5:1 to 1.5:1. These ratios may be measured using Si$^{29}$ nmr spectroscopy. The siloxane resins may alternatively be reactive siloxane resins of the type defined as ingredient A of WO2014/124389, incorporated herein by reference.

Adhesion Promoter

Suitable adhesion promoters may comprise alkoxysilanes of the formula R$^{14}_q$Si(OR$^{15}$)$_{(4-q)}$, where subscript q is 1, 2, or 3, alternatively q is 3. Each R$^{14}$ is independently a monovalent organofunctional group. R$^{14}$ can be an epoxy functional group such as glycidoxypropyl or (epoxycyclohexyl)ethyl, an amino functional group such as aminoethylaminopropyl or aminopropyl, a methacryloxypropyl, a mercapto functional group such as mercaptopropyl or an unsaturated organic group. Each R$^{15}$ is independently an unsubstituted, saturated hydrocarbon group of at least 1 carbon atom. R$^{15}$ may have 1 to 4 carbon atoms, alternatively 1 to 2 carbon atoms. R$^{15}$ is exemplified by methyl, ethyl, n-propyl, and iso-propyl.

Examples of suitable adhesion promoters include glycidoxypropyltrimethoxysilane and a combination of glycidoxypropyltrimethoxysilane with an aluminium chelate or zirconium chelate. The curable composition may comprise 0.01% to 1% of adhesion promoter based on the weight of the composition. Preferably, the speed of hydrolysis of the adhesion promoter should be lower than the speed of hydrolysis of the cross-linker in order to favour diffusion of the molecule towards the substrate rather than its incorporation in the product network.

Suitable surfactants include silicone polyethers, ethylene oxide polymers, propylene oxide polymers, copolymers of ethylene oxide and propylene oxide, other non-ionic surfactants, and combinations thereof. The composition may comprise up to 0.05% of the surfactant based on the weight of the composition.

The silicone based material as hereinbefore described can be made by intermixing the aforementioned two parts of the composition and subsequently curing the composition.

Subsequent to intermixing and in the absence of a reactive interlayer when applied onto a substrate, two alternative scenarios will result depending on the state in which it is applied. If the condensation curable composition is applied on to the surface of a substrate which might, for the sake of example, be a sheet or tile or the like, before curing, it can be applied using any suitable dispenser such as for example a curtain coater, spray device, die coater, dip coater, extrusion coater, knife coater or a screen coater and is subsequently allowed to cure. Given that the cure process occurs while the composition is on the substrate surface a chemically adhesive interaction between the substrate surface and the composition may occur during the cure process.

Alternatively, the condensation curable composition may be cured in an appropriate manner and then the resulting cured silicone based material may be applied onto the substrate in the form of e.g. a sheet or extruded strip with a predetermined cross-sectional shape. However, if application onto the surface of the substrate takes place subsequent to cure the adhesion of the elastomer to the substrate will be substantially of a physical adhesion type when applied directly to the substrate surface because while it will be tacky to the touch the elastomer will not significantly chemically interact with the substrate and thereby chemically adhere to the surface of the substrate. In such a situation the cured silicone based material being only physically adhered to the substrate surface is easily removable e.g. by peeling from the substrate surface.

Reactive Interlayer
Reactive Interlayer

Use of the reactive interlayer as herein described surprisingly enables the pre-cured condensation curable silicone based material to be chemically adhered to the surface of a substrate when applied post cure resulting in a significantly stronger adhesive bond then would have previously been expected. Typically, sealant type compositions when fully cured will have minimal —OH groups or other hydrolysable groups chemically available post cure. The chemical composition of the cured silicone based material as described above possesses an excess of silanol reactive groups post cure. These are able to chemically interact with a reactive interlayer that can be used to chemically adhere the silicone based material to the substrate surface.

The reactive interlayer creates a substantially non-reversible chemical bond to a suitable treated substrate at the interface between the silicone based material surface and the substrate.

The reactive interlayer coating composition is a material or a layer of an uncured sealant composition which can chemically interact with both the substrate surface and the silicone based material surface which are intended to be brought into contact together.

In one embodiment, the reactive interlayer coating composition may be applied in a "wet" and/or uncured state onto a cleaned surface of a substrate to form a reactive interlayer and then the surface of the silicone based material is brought into contact with the substrate surface by the application of pressure such that the reactive interlayer is sandwiched between the silicone based material surface and the substrate surface and chemical adhesion develops.

The composition used to generate the silicone based material upon curing is moisture curing and given the relative amounts of the ingredients will possess an excess of silanol reactive groups. Hence the reactive interlayer coating composition is typically a composition which will need to wet the surface to which it is to be applied and needs to contain reactive groups with the aforementioned silanol reactive groups in order to form chemical adhesion there between. Use of the term chemical adhesion is intended to mean that chemical bonding occurs across the reactive interlayer generating chemical adhesion of the silicone based material to the substrate.

Any suitable coating composition may be used as the reactive interlayer coating composition but preferably the coating composition will consist or comprise an appropriate composition containing a titanate or zirconate ingredient and/or a tin (II) and tin (IV) based ingredient. The coating composition may additionally contain silanes having groups which will chemically interact with the excess of silanol groups in the silicone based material, i.e. containing various functional groups such as amines, thiol, epoxy, alkoxy, acetoxy, oximino to enhance adhesion on various substrates.

The reactive interlayer coating composition may for example be a suitable coating composition comprising:
from 0.01 to 90% by weight, alternatively 0.5 to 75% by weight, alternatively 1 to 50% by weight, alternatively 1 to 20% by weight of a titanate, zirconate, tin II or Tin IV catalyst,
from 0 to 90% by weight alternatively 0.5 to 75% by weight, alternatively 1 to 50% by weight, alternatively 1 to 20% by weight of one or more silanes having at least two hydrolysable groups and optionally one or more alternative functional groups for create chemical bonds with substrate surfaces,
from 5 to 90% by weight alternatively 20 to 80% by weight, alternatively 40 to 70% by weight, of a silicone solvent or an organic solvent;
with the total weight % of the coating composition being 100 weight %.

Titanate/Zirconate

Organometallic reagents that may be used in the coating composition according to the present disclosure include organotitanate and/or organozirconate. Organotitanate may include, but is not limited to, tetrabutyl titanate, tetrapropoxy titanate, tetraethoxy titanate, tetraamyl titanate, titanium di-isopropoxy bis ethylacetoacetate, di-isopropoxy bis acetylacetonate, and any combination thereof. Organozirconate may include, but is not limited to, zirconium acetylacetonate.

Optionally Aluminium organometallic compounds may also be included in such a composition for example but not limited to, aluminium acetylacetonate.

Organotin Compound

Suitable organotin compounds which may be the basis for primer according to the present disclosure may include, but is not limited to, alkyltin ester compounds such as Dibutyltin dioctoate, Dibutyltin dimaleate, butyltin 2-ethylhexoate, dimethyl tin di-neodecyl ester, or dibutyltin dilaurate, dibutyl tin acetate and dibutyl tin 2-ethyl hexanoate, and any combination thereof.

Silanes

Silanes, when present in the reactive interlayer coating composition for use in or as the reactive interlayer as described herein include silanes with at least two hydrolyzable groups per molecule or alternatively at least three hydrolysable groups which hydrolysable groups are chemically reactive. When the silane has three silicon-bonded hydrolysable groups per molecule; the fourth group is suitably a non-hydrolys able silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic group is methyl.

Specific examples of suitable silanes include but are not limited to, alkyltrialkoxysilanes such as methyltrimethoxysilane (MTM) ethyltrimethoxysilane and methyltriethoxysilane, alkenyltrialkoxy silanes such as vinyltrimethoxysilane and vinyltriethoxysilane, isobutyltrimethoxysilane (iBTM). Other suitable silanes include, phenyltrimethoxysilane, alkoxytrioximosilane, alkenyltrioximosilane, 3,3,3-trifluoropropyltrimethoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, (ethylenediaminepropyl)trimethoxysilane, vinyl trimethoxysilane, tetraalkylorthosilicate having the general formula SiOR$_4$, tetraethoxysilane, mercapto functional-silanes, glycidyloxypropyl trimethoxysilane, amino functional silanes and any combination thereof.

The reactive interlayer coating composition which may be used as to create the reactive interlayer herein may additionally include other ingredients for example one or more polyorganosiloxane resin(s) which may be depicted using the following general formula of the following groups $(R^1R^2R^3SiO_{1/2})_a(R^4R^5SiO_{2/2})_bR^6SiO_{3/2})_c(SiO_{4/2})_d$. (often referred to as M, D, T, or Q units respectively) with, $0<a<1$, $b\leq 0$, $c\leq 0$, $0<d<1$, $a+b+c+d=1$, and $0.2<a/d<3.5$, (when a, b, c and d are mole fractions) with the resin having a weight-average molecular weight between about 1,000 and about 100,000, on a standard polystyrene basis by gel permeation chromatography.

Each $R^1$-$R^6$ is independently selected from a monovalent hydrocarbon groups, a carbinol group, an alkoxy group (preferably methoxy or ethoxy) or an amino group. Suitable exemplary monovalent hydrocarbon groups include, but are not limited to, alkyl groups such as methyl, ethyl, propyl, pentyl, octyl, undecyl, and octadecyl; alkenyl groups, cycloalkyl groups such as cyclopentyl and cyclohexyl; and aryl groups such as phenyl, tolyl, xylyl, benzyl, and 2-phenylethyl, and any combination thereof. In one embodiment, the organopolysiloxane is free of halogen atoms. In another embodiment, the organopolysiloxane includes one or more halogen atoms. Halogenated hydrocarbon groups include, but are not limited to, 3,3,3-trifluoropropyl, 3-chloropropyl, dichlorophenyl, and 6,6,6,5,5,4,4,3,3-nonafluorohexyl groups; and combinations thereof. The cyano-functional groups may include cyanoalkyl groups such as cyanoethyl and cyanopropyl groups, and combinations thereof.

Suitable alkenyl groups contain from 2 carbon atoms to about 6 carbon atoms and may be exemplified by, but not limited to, vinyl, allyl, and hexenyl. The alkenyl groups in this component may be located at terminal, pendant (non-terminal), or both terminal and pendant positions. $R^1$-$R^6$ do not include acrylate functional groups. One particularly preferred resin for the present invention is an MQ resin which comprises substantially only M units $(R^1R^2R^3SiO_{1/2})$ and Q units $(SiO_{4/2})$. But may contain minor amounts of D units $(R^4R^5SiO_{2/2})$ and/or T units $(R^6SiO_{3/2})$. The polyorganosiloxane resin may have a weight-average molecular weight between about 1,000 and about 100,000, on a standard polystyrene basis by gel permeation chromatography.

The polyorganosiloxane resin may have less than about 0.7% of hydroxyl groups bonded to silicon atoms.

A variety of solvents may be used in the reactive interlayer coating composition. Solvents that have gained VOC exempt status are preferred. Solvents that may be used include, but are not limited to, tert butyl acetate, methyl acetate, ethyl acetate, n-butyl acetate, methyl formate, ethyl formate, and any combination thereof. Preferably any solvent(s) utilized alone or in combination will be miscible or substantially miscible with the other ingredients in the coating composition. For example the solvent may be tert butyl acetate alone or in combination with one of the other solvents listed above in a ratio of tert butyl acetate:other solvent of from 70:30 to 95:5.

The reactive interlayer coating composition may be applied onto the substrate surfaces in a variety of different ways. One method includes applying the coating composition with a lint-free cloth to maximize the coverage rate and to obtain a consistent film thickness. It is also possible to use a brush or any other acceptable tool known to those of ordinary skill in the art to apply the coating composition according to the present disclosure.

Following application, were the coating composition being used merely as a primer it would be allowed to dry which might take from about 5 to about 60 minutes or less at ambient conditions, depending on the volatility of the solvent used in the composition. However, it has been identified that an almost immediate chemical adhesive bond is obtained when the reactive interlayer coating composition is applied to the silicone based material surface or the substrate surface or indeed both of said surfaces and then within the space of a short time, e.g. less than 10 minutes, preferably less than 5 minutes the silicone based material surface is placed onto the substrate surface and pressure applied to sandwich the reactive interlayer between the elastomer or gel surface and the substrate surface. It is preferred that the reactive interlayer coating composition be applied onto the surface of the substrate or both the surface of the substrate and the cured silicone based material.

It has further been identified that in the event that the reactive interlayer coating composition is allowed to dry on the substrate surface onto which it was first applied and then subsequently the silicone based material surface is brought into contact with the substrate surface and pressure applied to sandwich the reactive interlayer between the silicone based material surface and the substrate surface an initial physical adhesion is typically identified there between but after a time period of 1 to 2 days or more chemical bonding develops.

In the event that the reactive interlayer coating composition is a moisture cure sealant composition, any suitable composition may be utilized and may include one part and two part silicone RTV elastomer compositions which may be titanate/zirconate or tin catalyzed.

Such moisture cure sealant compositions for use as the reactive interlayer coating composition may comprise:
at least one condensation curable silyl terminated polymer having at least one, typically at least 2 hydrolysable and/or hydroxyl functional groups per molecule (ai);
a cross-linker (aii) and
a suitable condensation catalyst (aiii) as defined above. The amount of crosslinker present in the composition will depend upon the particular nature of the cross-linker and in particular, the molecular weight of the molecule selected.

The moisture cure sealant compositions for use as the reactive interlayer coating composition suitably contain crosslinker (aii) in at least a stoichiometric amount as compared to the polymeric material described above. Compositions may contain, for example, from 2-30% w/w of crosslinker, but generally from 2 to 10% w/w. Acetoxy crosslinkers may typically be present in amounts of from 3 to 8% w/w preferably 4 to 6% w/w whilst oximino crosslinkers, which have generally higher molecular weights will typically comprise from 3-8% w/w.

Preferably the catalyst, component (aiii), in moisture cure sealant compositions for use as the reactive interlayer coating composition will be present in an amount of from 0.3 to 6 parts by weight per 100 parts by weight of polymer (i), i.e. from about 0.2 to 2 weight % of the composition component (aiii) may be present in an amount of greater than 6 parts by weight in cases where chelating agents are used.

The moisture cure sealant compositions for use as the reactive interlayer coating composition may contain, as optional constituents, other ingredients which are conventional to the formulation of silicone rubber sealants and the like. For example, the compositions will normally contain one or more finely divided, reinforcing fillers such as high surface area fumed and precipitated silicas including rice hull ash and to a degree calcium carbonate as discussed above, or additional non-reinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3.2SiO_2$; kyanite; and $Al_2SiO_5$.

The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

In addition, a surface treatment of the filler(s) may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components The surface treatment of the fillers makes the ground silicate minerals easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material.

Other ingredients which may be included in the moisture cure sealant compositions for use as the reactive interlayer coating composition include but are not restricted to co-catalysts for accelerating the cure of the composition such as metal salts of carboxylic acids and amines; rheological modifiers; Adhesion promoters, pigments, Heat stabilizers, Flame retardants, UV stabilizers, Chain extenders, electrically and/or heat conductive fillers, Fungicides and/or biocides and the like (which may suitably by present in an amount of from 0 to 0.3% by weight), water scavengers, (typically the same compounds as those used as crosslinkers or silazanes.

The moisture cure sealant composition used as the reactive interlayer coating composition may be applied onto the silicone based material and/or substrate surfaces in any suitable manner known to the skilled man. Preferably the reactive interlayer will only be a few mm in thickness.

Again, it has been identified that an almost immediate chemical adhesive bond is obtained when the reactive interlayer coating composition is applied to the silicone based material surface or the substrate surface and then within the space of a short time, e.g. less than 10 minutes, preferably less than 5 minutes the silicone based material surface is placed onto the substrate surface and applying pressure to sandwich the reactive interlayer between the elastomer or gel surface and the substrate surface.

It has further been identified that in the event that the reactive interlayer coating composition is allowed to dry on the substrate surface onto which it was first applied and then subsequently the silicone based material surface is brought into contact with the substrate surface and pressure applied to sandwich the reactive interlayer between the elastomer or gel surface and the substrate surface initial physical adhesion is observed but after a time period of 1 to 2 days or more chemical bonding develops.

The spacer as hereinbefore described may be utilised as a pre cured silicone spacer to assemble transparent units or devices such as insulating glass units, electronic displays, weather sealants, optical devices, light emitting diodes, lenses etc.

It is very challenging to assemble parts that are entirely transparent because any defect, any dust, any glue leaks can be easily noticed or observed through the transparency of the parts. The use of a transparent liquid applied adhesive that will cure is often used for such a purpose, But it is difficult to apply because the assembled parts need to be pre fixed together to be able to apply the liquid product. If the assembled parts are not attached by a mean the parts may move away from each other upon the application of the liquid adhesive. For such a purpose the use of clamps, tapes and/or spacers are required to pre assemble parts together. If a spacer is used between two sheets of glass for instance, it will remain in the assembly are therefore this spacer will have to be transparent to maintain the transparency of the unit.

The present invention is describing a transparent spacer that will develop almost immediately an adhesion to the parts if these parts have been primed by the described reactive interlayer coating composition of the invention. In some cases the final strength of the transparent spacer will be sufficient for the application, while in some case the use of an additional structural adhesive will be required. If the spacer itself is used, then assemblies such as shown in the pictures here below will be feasible with the present invention. The high transparency of the pre-cured spacer applied using the present process will contribute to the nice aesthetics of the parts, which are desirable to produce nice designs for various purpose.

It is to be appreciated that such assemblies can be used for building transparent internal partitions, transparent windows and doors, especially for refrigerators, where thermal insulation is desired. The current pre cured spacer can also be useful for assembling cold or hot bended glass units, where the use of a structural spacer is a clear attribute. If transparent parts can be assembled, non-transparent parts can also be considered in combination or not with transparent parts. The transparent spacer may have decorative, optical and or electronic devices fully or partially incorporated into the body of the spacer prior to curing. Said devices are then cured in the normal manner as previously discussed. The resulting cured transparent spacer will then have said devices visible therein or on thereon unless hidden from view behind a frame for e.g. security reasons.

The use of a flexible spacer is also interesting in assembling rounded edge parts. It can also be very interesting to provide all sort of designs to the assembly (see attached picture spiral).

The transparent structural spacer can also be useful to assemble parts, which are sensitive to temperature, ultraviolet or liquids. It can be useful to assemble electronic parts, optical devices, displays made of glass, metals or plastics. It is useful to assemble panels together for internal partition in building but as well for facades and roofs. It is useful for assembling parts in appliance, automotive or aerospace, especially where transparency is desirable.

Hence, the substrates may include glass sheets for flat panel displays (LED, LCD screens), glass panels for facades or cars, metal, plastic, wood, concrete or stone plates for construction, automotive, electronics etc. metal, plastic, wood, concrete fixations, like hooks, screws, nuts.

The spacer can be extruded into any appropriate cross-sectional shape. Typically rectangular cross-sections or square cross-sections are preferred. Insulated glass units may comprise one or more than one spacer. For example, spacers as described herein might be used for parts of a unit which an opaque or coloured spacer would otherwise obscure but other standard spacers might be used in areas where the spacer material will not obscure the vision of the user looking through the unit.

It will be noted that generally the units described are referred to as glass units, it should be understood that whilst glass has been used as an examples and alternative transparent materials may be used, if appropriate to the situation. Furthermore, in some instances the insulated glazing unit might comprise one or more transparent panes of glass or the like and one pane which is rendered opaque due to patterning or the like.

The present invention also extends to a method of making insulated glazing units as set forth above comprising providing a first pane of glass having a first major surface and a second pane of glass having a first major surface.

Applying a coating of reactive interlayer coating composition on the surface the first major surface of each of said first and second panes of glass and allowing them to dry/cure Applying a transparent spacer as hereinbefore described onto the first major surface of the first glass panel which had been pre-treated with a reactive interlayer.

Positioning the region of the first major surface of the second glass panel having which had been pre-treated with a reactive interlayer onto the spacer and leaving the spacer to adhere to the glass surfaces via the reactive interlayer. If required, then Filling a cavity around the periphery of the glass panels, with a preferably transparent secondary sealant, which may preferably be a moisture-curable hot melt silicone adhesive composition as hereinbefore described, said cavity defined by the first major surface of the first glass panel, external surface of transparent spacer and the first major surface of the second glass panel.

Curing the secondary sealant to bond with the two glass panels and form an insulated glazing unit.

In one embodiment of the above there is provided a process of making an insulating glass unit comprising the following steps carried out in any desired order namely procuring two glass panes, providing between the two glass panes an endless strip of transparent thermoplastics material in a plastic state applied as a hot melt, optionally containing a dehydrating material, urging the two glass panes towards each other against the thermoplastics material to form a spacer comprising the thermoplastics material adherent to the panes, optionally introducing to the cavity defined by the two panes and the spacer an inert or heavy gas and applying a layer of transparent silicone adhesive composition, preferably a moisture-curable hot melt silicone adhesive composition as hereinbefore described located at the periphery of the unit in contact with external surfaces of the spacer.

If required in an insulating glass unit as hereinbefore described the gas trapped within the unit preferably comprises or consists of $SF_6$ or an inert gas such as argon, xenon and krypton to improve the level of thermal or acoustic performances achieved. When present, in order to ensure sufficient thermal or acoustic insulation properties, we prefer to ensure that at least 90% of the gas trapped within the unit is argon, xenon, krypton or $SF_6$ or mixtures thereof. In the event that a suitable gas would be utilised then a primary sealant would need to be introduced into the system to prevent the gas from escaping.

If required the insulating glass unit can be assembled with the use of a primary sealant, typically a polyisobutylene (PIB) composition, which can be opaque or transparent to minimize the gas or moisture exchanges between the interior cavity and the exterior. The design of such a unit can be multiple. Either the PIB composition is applied on a separate substrate possibly transparent applied either internally or externally of the silicone spacer or the PIB composition is integrated in the silicone spacer by any means prior or after cure of the silicone composition.

In a further embodiment, the insulating glass unit is assembled with the use of a primary sealant applied onto a metallic film, which constitutes a gas barrier film to minimize the gas or moisture exchanges between the interior cavity and the exterior.

Figure 2:
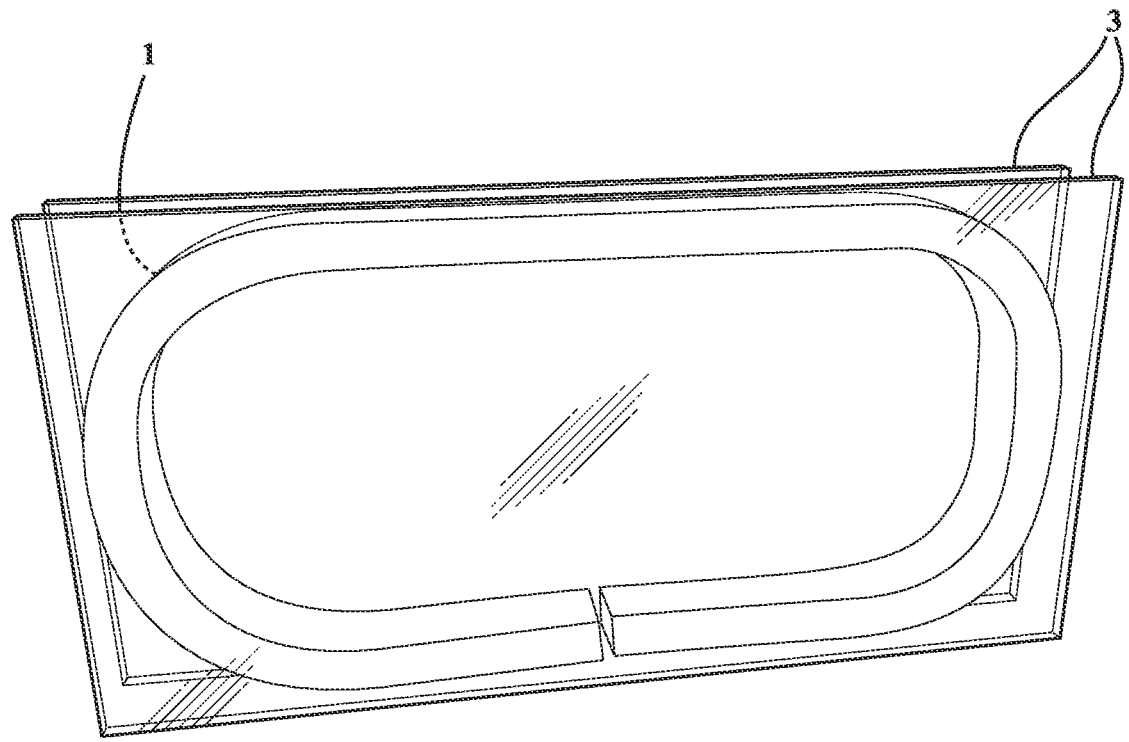
Figure 3:
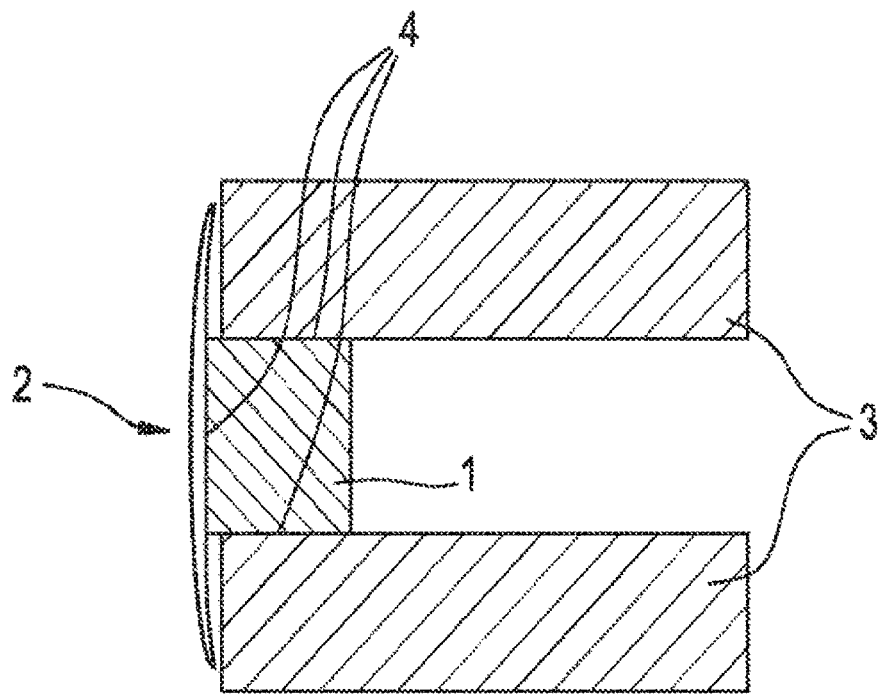
FIGS. 3 and 4 show examples of insulated glazing (IG) unit designs.
Figure 4:
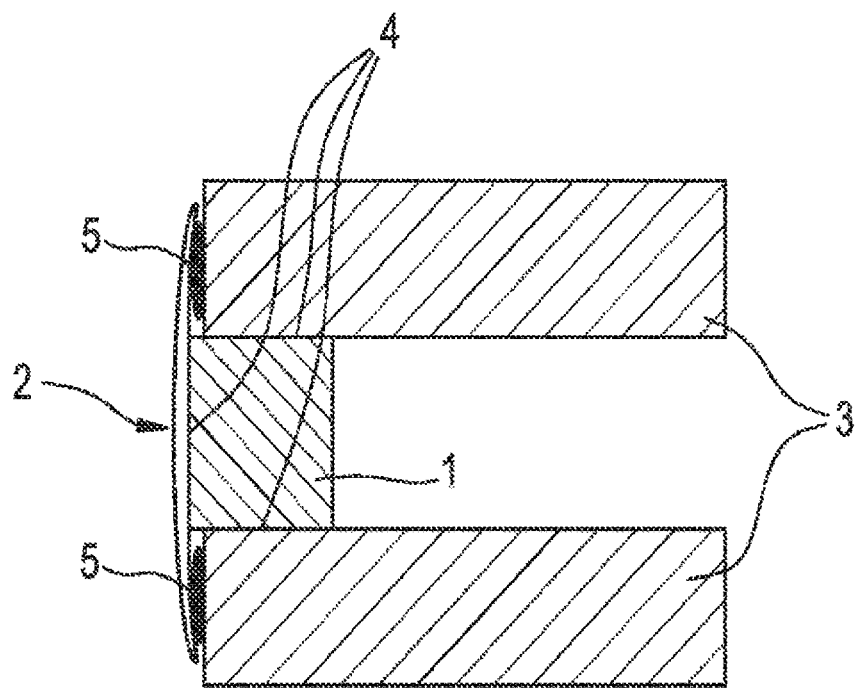

FIGS. 1 and 2 are depict two examples of panes of glass separated by the transparent spacer as described herein. A primer was used as the reactive interlayer coating composition. The reactive inter layer was applied to the glass surface a few minutes before the pre condensation cured strip was applied. FIGS. 3 and 4 are showing examples of IG unit designs, are envisaged using the concept of the present invention.

FIG. 3 is a design suitable to produce e.g. an insulated glazing (IG) unit for internal partitions or refrigerators. FIG. 4 is a design suitable for producing standard IG units for windows and doors given it comprises a primary seal to prevent moisture and gas to diffuse in and out of the unit. In FIGS. 3 and 4 some possible designs of a transparent spacer (1) as described herein and its edge protection (2) are depicted. Both spacers (1) are bonded to the inner facing sides of transparent panes (3) due to the presence of reactive interlayer (4) applied on the inner facing surface of transparent panes (3) prior to application of the spacer. The two transparent panes (3), are preferably glass panes and are adhered to the spacer (1) by way of the respective reactive interlayer (4). The spacer (2) can be formed, e.g. extruded into any suitable shape depending on the intended end use. The spacer (2) can also be made of material exhibiting gas barrier properties such as metal, glass or metallized plastics. To improve gas barrier properties an additional gas barrier (5) can be inserted between panes (3) and spacer (2) and/or between panes (3) and (4). Gas barrier (5) is preferably a low gas permeable material such as polyisobutylene sealant.

The panel design could combine a transparent spacer design with a standard IG spacer design so to include a desiccant in the non transparent region.

EXAMPLES

The compositions used for examples were as follows with viscosity values at 25° C. measured by using a Brookfield cone plate viscometer (RV DIII) using a cone plate. Compositions were applied at 23° C. and 50% relative humidity.

TABLE 1

Base Composition Part

|  | A | B | C | D | E Comparative example Tin (IV) |
|---|---|---|---|---|---|
| OH terminated polydimethylsiloxane (viscosity ca 50,000 mPa · s) | 97.4 | | | | |
| OH terminated polydimethylsiloxane (viscosity ca 13,500 mPa · s) | | 91.6 | 99.1 | | 96.75 |
| Trimethoxysilyl terminated polydimethylsiloxane (viscosity ca 56,000 mPa · s) | | 8.4 | | 100 | |
| Nanocyl ® NC 7000 carbon nanotubes | 1.6 | | 0.9 | | |
| 1,6 bis (trimethoxysilyl) hexane | 1.0 | | | | 3.25 |

TABLE 2

Catalyst Composition Part

|  | A | B | C | D | E Comparative example Tin (IV) |
|---|---|---|---|---|---|
| OH terminated polydimethylsiloxane (viscosity ca 50,000 mPa · s) | 49.39 | | | | |
| OH terminated polydimethylsiloxane (viscosity ca 13,500 mPa · s) | 49.39 | | | | 99.42 |
| OH terminated polydimethylsiloxane (viscosity ca 4,000 mPa · s) | | | 94.9 | | |
| Trimethoxysilyl terminated polydimethylsiloxane (viscosity ca 56,000 mPa · s) | | 99.26 | | 99.7 | |

TABLE 2-continued

Catalyst Composition Part

|  | A | B | C | D | E Comparative example Tin (IV) |
|---|---|---|---|---|---|
| Nanocyl ® NC 7000 carbon nanotubes | 1.01 | | | | |
| Cabosil ® LM150 fumed silica | | | | 4.7 | |
| tetra n-butyl titanate | 0.22 | 0.74 | 0.3 | | |
| Dimethyltin neodecanoate | | | | | 0.58 |

The mixing ratio of the base part to the catalyst part was 1:1 for formulation A, 10 to 1 for formulation B, 1.75 to 1 for formulation C, 1 to 1 for formulation D and 1:1 for formulation E.

EXAMPLES

Example 1

Formulation A

A float glass substrate was treated with DOW CORNING® 1200 OS PRIMER CLEAR a commercial Primer from Dow Corning Corporation of Michigan, USA, which has been used according to the manufacturer's instructions and used as reactive interlayer coating composition.

Strips of pre-cured formulation A material (approx. 1 cm width, 5-6 cm in length and 2 mm thick were attached to above described substrate at different times after the application of the DOW CORNING® 1200 OS PRIMER CLEAR.

The adhesion of the strips to the float glass substrate was examined after approximately one hour and Table 3 summarizes the results.

Y means that a strip was well adhered to the glass plates and that attempts to remove it resulted in a cohesive failure within the strip.

N means that the strip was easily removable (peeled off)-adhesive failure) from the glass substrate.

TABLE 3

| Time upon treatment with DOW CORNING ® 1200 OS PRIMER CLEAR | Result |
|---|---|
| <1 min | Y |
| 5 | Y |
| 10 | Y |
| 20 | N/Y |
| 30 | N |
| COMPARATIVE Example 1 (no reactive interlayer on substrate) | Does not stick and removed adhesively |

Example 2. Cured materials were prepared from compositions A, B and C as depicted in Tables 1 and 2. Strips of approx. 12 cm length by 2 cm width and 2 mm thickness were adhered to glass plates. Half of the surface of these plates was pre-treated with DOW CORNING® 1200 OS PRIMER CLEAR, which serves as reactive interlayer. The DOW CORNING® 1200 OS PRIMER CLEAR was used according to the manufacturer's instructions. The strips were brought into contact with the glass substrate within 2 minutes of the application of DOW CORNING® 1200 OS PRIMER CLEAR thereon.

Upon inspection it was noticed that the strips peel adhesively from the part which has not been coated with DOW CORNING® 1200 OS PRIMER CLEAR (i.e. adhered by physical adhesion). In contrast, it was impossible to detach the strips from the part treated with the reactive interlayer without breaking the strip itself (i.e. adhered by chemical adhesion).

Example 3

Elastomer/gel materials of formulation D as well as a Sn-cure elastomer formulation E (comparative example) were cured in moulds to form circular 1-cm thick articles. These articles were adhered to stainless steel plates (substrates). Half the surface of these plates was pre-treated with DOW CORNING® 1200 OS PRIMER CLEAR, which served as a reactive interlayer. The articles were attached to the steel plates within 2 minutes of the application of DOW CORNING® 1200 OS PRIMER CLEAR in the same manner as depicted in FIG. 8. Results are summarized in table 4.

TABLE 4

| Cured material | E Sn IV based elastomer (comparative example) | D |
| --- | --- | --- |
| Adhesion to untreated substrate surface (no reactive interlayer) | Adhesive failure, does not stick | Adhesive failure, does not stick |
| Adhesion to substrate treated with reactive interlayer | Adhesive failure, does not stick | Adhesion, cohesive failure |

Example 4

The experiment described in example 3 was repeated using an aluminium substrate. The cured material used was a 5 cm by 1 cm cured strip of composition C as depicted in Tables 1 and 2 above. Upon inspection it was determined that the strip did not adhere to the part of the aluminium substrate surface which had not been pre-treated with the reactive interlayer and as such due to physical nature of the adhesion these were easily detached (peeled off). In contrast, it was impossible to detach the strip from the part of the aluminium substrate surface pre-treated with the reactive interlayer coating composition (DOW CORNING® 1200 OS PRIMER CLEAR). The strip itself broke cohesively due to the chemical nature of adhesion to the substrate surface.

Example 5

The surface of a stainless steel plate (approx. 10×15 cm) was divided in three areas. The three areas were treated as follows:
(1) no treatment
(2) DOW CORNING® 1200 OS PRIMER CLEAR (3) primer DOW CORNING® OS 3 in 1 primer/cleaner.

The two primers were used to prepare reactive interlayers and were applied according to the manufacturer's instructions.

A strip of pre-cured composition B, as depicted in Tables 1 and 2, which was the same size as the steel plate and a thickness of about 2 mm was cut and carefully placed on the plate. After approximately 70 hours attempts were made to remove the elastomer strip from the plate. Only physical adhesion (clean peel) was observed on the part of the plate not treated with primer. The other two parts of the plate were strongly bound (chemically) to formulation B and a clean detachment was impossible. The strongest adhesion was observed for the part of the surface primed with DOW CORNING® 1200 OS PRIMER CLEAR.

Example 6

Cured materials were prepared by mixing the two components of the composition together in a Base:curing agent weight ratio of 1:1. The base component was:
a 2,000 mPa·s (at 25° C.) silanol terminated polydimethylsiloxane. The curing agent components were:
100 weight parts of a 2,000 mPa·s trimethoxysilyl terminated polydimethylsiloxane (at 25° C.) and
0.2 weight parts of tetra-n-butyl titanate.

The material was mixed in a speedmixer 4 times 30 seconds at a speed of 2300 rpm. The material was poured into a 2 meter long PVC U-shaped profile with internal dimension 18×5 mm$^2$ and was allowed to cure for 7 days. The resulting cured material was applied on glass panes which had been primed several minutes earlier using Dow Corning® 1200 OS primer. An example of this is provided as FIG. 1 which depicts two panes of glass separated by a continuous ribbon of the cured material adhered to the periphery of the of each glass panes effectively functioning as spacer between the two panes of glass.

The upper surface of the lower glass pane depicted and the lower surface of the upper glass pane were coated around their peripheries with Dow Corning® 1200 OS primer which was allowed to dry for approximately 30 minutes.

A pre-measured ribbon of cured material as hereinbefore described was applied to the periphery of the upper surface of the lower glass pane and subsequently the lower surface of the upper pane of glass was adhered to the cured material in the regions previously primed. Almost immediately after construction the glass unit depicted in FIG. 1 could be moved and handled without impairing the structure of the construction because of the strength of the bonds formed as described herein.

Example 7

H-shaped samples of the pre-cured silicone, based on the composition in example 6, were moulded in a 2 meter long PVC U-shaped profile with internal dimension 18×5 mm$^2$ and allowed to cure at room temperature for 7 days. 50 mm long sample pieces of this moulded product were prepared (approximate dimensions: 50×18×5 mm$^3$). Glass pieces having 50×70×4 mm$^3$ were primed on one surface with Dow Corning® 1200 OS primer and left for about 30 minutes. The samples of the pre cured silicone were then applied on the primed glass leading to tensile H-pieces units.

H-piece samples were also applied to the unprimed glass surfaces following the above process excepting the application of primer. As previously explained, without the use of the primer the H shaped sample pieces showed minimal or no adhesion to the glass surface because they have no structural strength to adhere to the glass part. Unlike the above, H-shaped samples of the pre-cured silicone material adhered to the primed glass surface were adhered to the primed glass surface almost immediately after application. Such sample pieces were tested for physical characteristics using a Zwick tensiometer in accordance with ASTM D412-98a.

It was noted that H-shaped samples, tested 20 minutes after application to a primed glass surface as described above, exhibit an immediate green strength of about 0.02

MPa but adhesive failure is observed, while H-shaped samples tested 7 days after application gave comparatively higher tensile strength results and exhibited cohesive failure. The results of these physical tests are provided in Table 5 below.

TABLE 5

H pieces on glass cured after 7 days

| Time after application | Mode of failure | Tensile Strength (MPa) | Elongation at break (%) | Modulus at 12.5% elongation |
|---|---|---|---|---|
| 20 minutes after application | Adhesive failure | 0.02 | 6 | — |
| 20 minutes after application | Adhesive failure | 0.03 | 8 | — |
| 20 minutes after application | Adhesive failure | 0.04 | 11 | — |
| 7 days after application | Cohesive failure | 0.08 | 26 | 0.04 |
| 7 days after application | Cohesive failure | 0.06 | 26 | 0.04 |
| 7 days after application | Cohesive failure | 0.05 | 22 | 0.04 |

Example 8

Cured materials were prepared by mixing the two components of the composition together in a Base:curing agent weight ratio of 1.5:1.

The base components were:
  50 weight % of a 2,000 mPa·s (at 25° C.) silanol terminated polydimethylsiloxane.
  50 weight % of a 13,500 mPa·s (at 25° C.) silanol terminated polydimethylsiloxane The curing agent components were:
  50 weight parts of a 2,000 mPa·s trimethoxysilyl terminated polydimethylsiloxane (at 25° C.), 50 weight parts of a 62,000 mPa·s trimethoxysilyl terminated polydimethylsiloxane (at 25° C.) and
  0.2 weight parts of tetra-n-butyl titanate.

The 2 parts were introduced into a speedmixer and then mixed therein 4 times for periods of 30 seconds at a speed of 2300 rpm. The resulting mixture was poured into a 2 meter long PVC U-shaped profile with internal dimension 12×12 mm² and was allowed to cure for 7 days at room temperature. The resulting cured material was cut at lengths of 50 mm and applied on substrates which had been pre-treated 2 minutes earlier using Dow Corning® 1200 OS primer as the reactive interlayer coating composition in order to generate H-pieces for tensile testing. Such sample pieces were tested for physical characteristics using a Zwick tensiometer in accordance with ASTM D412-98a. The results of the tensile testing for the pre-cured condensation curable material are shown in table 6a, which highlights good to excellent adhesion of the pre cured spacer material onto various substrates. It was found that even after immersion in hot water, (Table 6b) adhesion remains excellent on non-plastic substrates, demonstrating the durable chemical adhesion of the pre-cured spacer product to such substrates, when applied thereon after it had been pre-treated with the reactive interlayer coating composition.

TABLE 6a

Initial Results

| Substrate | Adhesion (% CF) | Tensile strength (MPa) | Elongation at break (%) | modulus at 100% elongation (MPa) |
|---|---|---|---|---|
| Glass non tin | 100 | 0.08 | 201 | 0.05 |
| Glass tin | 100 | 0.08 | 190 | 0.05 |
| Anodized aluminium | 85 | 0.05 | 125 | 0.05 |
| PVC | 100 | 0.06 | 140 | 0.05 |
| PMMA | 33 | 0.04 | 75 | 0.05 |

TABLE 6b

Results after immersion for 1000 h at 45° C.

| Substrate | Adhesion (% CF) | Tensile strength (MPa) | Elongation at break (%) | modulus at 100% elongation (MPa) |
|---|---|---|---|---|
| Glass non tin | 100 | 0.05 | 109 | 0.05 |
| Glass tin | 100 | 0.06 | 155 | 0.05 |
| Anodized aluminium | 100 | 0.06 | 140 | 0.05 |
| PVC | 0 | 0.01 | 25 | — |
| PMMA | 0 | 0.01 | 9 | — |

The invention claimed is:

1. A transparent unit comprising first and second panes of transparent material each having an outwardly facing side and an inwardly facing side, each inwardly facing side is at least partially coated with a reactive interlayer and the inwardly facing side of the first and second panes of transparent material are spaced apart partially or totally by a transparent spacer made of a pre-cured silicone based material adhered to the inwardly facing side of the first and second panes of transparent material by way of the reactive interlayers; wherein the pre-cured silicone based material is an elastomer or a gel reaction product of a condensation curable silicone composition, with the composition comprising:
  (i) at least one condensation curable silyl terminated polymer having at least one hydrolysable and/or hydroxyl functional group(s) per molecule;
  (ii) a cross-linker selected from the group consisting of:
    silanes having at least two hydrolysable groups per molecule group, and/or
    silyl functional molecules having at least two silyl groups, with each silyl group containing at least one hydrolysable group; and
  (iii) a condensation catalyst selected from the group consisting of titanates and zirconates;
    wherein the molar ratio of hydroxyl groups to hydrolysable groups is between 0.1:1 to 4:1;
    wherein the titanates and zirconates comprise M-OR functions where M is titanium or zirconium and R is an aliphatic hydrocarbon group; and
    wherein the molar ratio of M-OR functions to the hydroxyl groups is from 0.01:1 and 0.6:1.

2. The transparent unit in accordance with claim 1, wherein the transparent unit is a glazing unit and the first and second panes of transparent material are glass.

3. The transparent unit in accordance with claim 1, wherein:
  (i) the condensation curable silyl terminated polymer has at least two hydrolysable and/or hydroxyl functional groups per molecule; and/or (ii) the cross-linker is selected from the group consisting of;
    silanes having at least three hydrolysable groups per molecule group, and/or
    silyl functional molecules having at least two silyl groups, with each silyl group containing at least one hydrolysable group.

4. The transparent unit in accordance with claim 1, wherein the condensation curable silicone composition is stored in a two-part manner prior to cure having polymer (i) and cross-linker (ii) in one part and polymer (i) and catalyst (iii) in the other part, or having cross-linker (ii) in one part and polymer (i) and catalyst (iii) in the other part, or polymer (i) and optionally cross-linker (ii) in one part and cross-linker (ii) and catalyst (iii) in the other part.

5. The transparent unit in accordance with claim 1, wherein the pre-cured silicone based material is tacky to the touch given the presence of reactive polymer chains for physical adhesion to occur when the pre-cured silicone based material is brought into contact with a substrate surface.

6. The transparent unit in accordance with claim 1, wherein the reactive interlayer is prepared by the application of a reactive interlayer coating composition onto a substrate surface, which reactive interlayer coating composition is a coating composition or a layer of an uncured sealant composition which can chemically interact with both the substrate surface and/or the pre-cured silicone based material surface.

7. The transparent unit in accordance with claim 6, wherein the reactive interlayer coating composition is a coating composition comprising a composition containing a titanate or zirconate ingredient and/or a tin (II) and/or tin (IV) based ingredient and optionally one or more silanes having groups which will chemically interact with excess silanol groups in the pre-cured silicone based material.

8. The transparent unit in accordance with claim 6, wherein the reactive interlayer coating composition is a coating composition comprising:
    from 0.01 to 90% by weight of a titanate, zirconate, tin (II) or tin (IV) catalyst;
    from 0 to 90% by weight of one or more silanes having at least two hydrolysable groups and optionally one or more alternative functional groups for creating chemical bonds with substrate surfaces; and
    from 5 to 90% by weight of a silicone solvent or an organic solvent;
    with the total weight % of the coating composition being 100 weight %.

9. The transparent unit in accordance with claim 8, wherein the reactive interlayer coating composition is a coating composition comprising:
    from 1 to 50% by weight of a titanate, zirconate, tin (II) or tin (IV) catalyst;
    from 1 to 50% by weight of one or more silanes having at least two hydrolysable groups and optionally one or more alternative functional groups for creating chemical bonds with substrate surfaces; and
    from 5 to 90% by weight of a silicone solvent or an organic solvent;
    with the total weight % of the coating composition being 100 weight %.

10. The transparent unit in accordance with claim 8, wherein the functional groups are selected from amines, thiol, epoxy, alkoxy, acetoxy, or oximino, to enhance adhesion on various substrates.

11. A method of making the transparent unit in accordance with claim 1, said method comprising:
    (i) applying a coating of reactive interlayer coating composition on the inwardly facing side of each of the first and second transparent panes and allowing them to dry/cure for a predefined time period;
    (ii) applying the transparent spacer onto the inwardly facing side of the first transparent pane which has been pre-treated with the reactive interlayer coating composition; and
    (iii) positioning the region of the inwardly facing side of the second transparent pane which has been pre-treated with a reactive interlayer onto the transparent spacer and leaving the transparent spacer to adhere to the respective inwardly facing side of the transparent panes via the reactive interlayer;
    (iv) optionally, filling a cavity around a periphery of the transparent panes with a secondary sealant, and if present curing the secondary sealant to bond with the two transparent panes.

12. The method in accordance with claim 11, wherein the transparent unit is an insulated glazing unit.

13. The method in accordance with claim 11, wherein the secondary sealant is present and is a transparent moisture-curable hot melt silicone adhesive composition.

14. The method in accordance with claim 11, wherein the reactive interlayer is chemically reactable with the substrate surface and/or the surface of the pre-cured silicone based material.

15. The method in accordance with claim 11, wherein the reactive interlayer coating composition is applied in a wet and/or uncured state onto a cleaned surface of a substrate and then a facing surface of the pre-cured silicone based material is brought into contact with the substrate surface by the application of pressure such that the reactive interlayer is sandwiched between the pre-cured silicone based material surface and the substrate surface and chemical adhesion develops.

16. The method in accordance with claim 11, wherein the reactive interlayer coating composition is a coating composition comprising:
    from 0.01 to 90% by weight of a titanate, zirconate, tin (II) or tin (IV) catalyst;
    from 0 to 90% by weight of one or more silanes having at least two hydrolysable groups and optionally one or more alternative functional groups for creating chemical bonds with substrate surfaces; and
    from 5 to 90% by weight of a silicone solvent or an organic solvent;
    with the total weight % of the coating composition being 100 weight %.

17. The method in accordance with claim 16, wherein the reactive interlayer coating composition is a condensation curable sealant composition comprising:
    at least one condensation curable silyl terminated polymer having at least one, optionally at least two, hydrolysable and/or hydroxyl functional group(s) per molecule (ai);
    a cross-linker (aii); and
    a condensation catalyst (aiii).

18. The method in accordance with claim 11, wherein the reactive interlayer coating composition is allowed to dry and/or cure on the substrate surface onto which it was first applied and then subsequently the pre-cured silicone based material surface is brought into contact with the substrate surface and pressure is applied to sandwich the reactive interlayer between an elastomer or a gel surface and the substrate surface and initial physical adhesion is observed but after a time period of 1 to 2 days or more chemical bonding develops.

19. The transparent unit in accordance with claim 1, wherein the transparent spacer edge is protected by a metal, a glass or a plastic profile, optionally wherein a gas barrier sealant is added to reduce gas and moisture permeation inside or outside the unit.

20. The transparent unit in accordance with claim 1, wherein a desiccant is in contact with gas present in an internal cavity of the unit to reduce moisture ingress.

* * * * *